(12) United States Patent
Gomberg et al.

(10) Patent No.: US 11,770,095 B2
(45) Date of Patent: Sep. 26, 2023

(54) ENERGY HARVESTING AND ELECTRICAL POWER GENERATION

(71) Applicant: Solaredge Technologies Ltd., Herzeliya (IL)

(72) Inventors: Bryon Roos Gomberg, Kfar Sava (IL); Ilan Yoscovich, Ramat Gan (IL)

(73) Assignee: Solaredge Technologies Ltd., Herzeliya (IL)

( * ) Notice: Subject to any disclaimer, the term of this patent is extended or adjusted under 35 U.S.C. 154(b) by 204 days.

(21) Appl. No.: 17/132,250

(22) Filed: Dec. 23, 2020

(65) Prior Publication Data
US 2021/0203268 A1 Jul. 1, 2021

Related U.S. Application Data

(60) Provisional application No. 62/954,835, filed on Dec. 30, 2019.

(51) Int. Cl.
*H02S 10/10* (2014.01)
*H02S 20/10* (2014.01)
(Continued)

(52) U.S. Cl.
CPC .............. *H02S 10/10* (2014.12); *F03B 13/14* (2013.01); *F03D 9/25* (2016.05); *H02S 20/10* (2014.12);
(Continued)

(58) Field of Classification Search
CPC .......... H02S 10/10; H02S 20/00; H02S 20/10; H02S 40/32; H02S 40/425; F03G 7/05;
(Continued)

(56) References Cited

U.S. PATENT DOCUMENTS

| 4,379,972 A | * | 4/1983 | Sosa | .................. F03D 9/34 |
| | | | | 290/55 |
| 4,505,256 A | * | 3/1985 | Kirchmayer | ............ F24S 20/40 |
| | | | | 126/621 |

(Continued)

FOREIGN PATENT DOCUMENTS

| CN | 113131835 A | * | 7/2021 | .............. F03B 13/14 |
| DE | 102008020587 A1 | | 5/2009 | |

(Continued)

OTHER PUBLICATIONS

Mar. 26, 2021—Partial European Search Report—EP 20217028.8.
Ying, Pei et al., Oct. 8, 2014, "An aerodynamic analysis of a novel small wind turbine based on impulse turbine principles".

*Primary Examiner* — Pedro J Cuevas
(74) *Attorney, Agent, or Firm* — Banner & Witcoff, Ltd.

(57) ABSTRACT

An apparatus for harvesting energy, such as solar, wind, wave, thermal, and the like, including a solar panel and a duct supporting the solar panel at an operational angle. The duct comprises a bottom shroud and side shrouds, therein forming a large aperture, a small aperture, and an oblique frustum shaped cavity. The oblique frustum shaped cavity is configured to direct a flow of fluid from the large aperture to the small aperture. A flow energy generator, such as a turbine, located at the small aperture is configured to collect flow energy. Temperature differences between the solar panel and the environment may be used to harvest thermal energy with a thermoelectric generator. Fluid flow under the solar panel may decrease the panel temperature and increase the efficiency. Generators may be operated in reverse to lower the solar panel temperature and increase efficiency.

21 Claims, 8 Drawing Sheets

(51) Int. Cl.
  *H02S 40/32*   (2014.01)
  *H02S 40/42*   (2014.01)
  *F03D 9/25*    (2016.01)
  *F03B 13/14*   (2006.01)
(52) U.S. Cl.
  CPC ............ *H02S 40/32* (2014.12); *H02S 40/425* (2014.12); *F05B 2220/706* (2013.01); *F05B 2220/708* (2013.01); *Y02E 10/72* (2013.01)
(58) Field of Classification Search
  CPC .. F03B 3/18; F03B 13/14; F03B 13/22; F03D 3/0427; F03D 9/007; F03D 9/008; F03D 9/25; F03D 9/37; F05B 2220/706; F05B 2220/708; Y02E 10/30; Y02E 10/46; Y02E 10/72; Y02E 10/728; Y02E 10/74
  See application file for complete search history.

(56) References Cited

U.S. PATENT DOCUMENTS

| | | | |
|---|---|---|---|
| 6,201,313 B1 | 3/2001 | Nakamats | |
| 6,765,309 B2 * | 7/2004 | Tallal, Jr. | F03D 13/20 290/55 |
| 7,579,701 B1 * | 8/2009 | White | F03D 3/002 290/43 |
| 8,210,792 B2 * | 7/2012 | Suma | H02S 10/12 415/126 |
| 8,368,240 B1 * | 2/2013 | Burkett | F03D 9/11 290/55 |
| 8,375,936 B2 * | 2/2013 | Albritton | F24S 20/67 165/104.34 |
| 8,386,197 B1 * | 2/2013 | Plaisted | H02S 50/10 702/58 |
| 8,487,463 B2 * | 7/2013 | Ho | H02S 10/12 290/44 |
| 9,027,289 B1 * | 5/2015 | Burtt | H02S 40/425 126/621 |
| 9,103,563 B1 * | 8/2015 | Burtt | F24S 25/35 |
| 2002/0117166 A1 * | 8/2002 | Okumura | F24D 5/005 126/621 |
| 2004/0154615 A1 * | 8/2004 | Komano | F24F 5/0046 126/631 |
| 2010/0170501 A1 * | 7/2010 | Albritton | F24S 20/67 165/104.34 |
| 2011/0021134 A1 * | 1/2011 | Zwern | F24S 10/30 454/343 |
| 2011/0049992 A1 | 3/2011 | Sant'Anselmo et al. | |
| 2011/0095538 A1 * | 4/2011 | Tabe | F03D 9/34 290/55 |
| 2011/0181049 A1 * | 7/2011 | Ho | F03D 9/007 290/1 R |
| 2011/0209742 A1 * | 9/2011 | Narayanamurthy | F24F 7/025 165/47 |
| 2011/0223850 A1 * | 9/2011 | Narayanamurthy | F24F 3/14 454/239 |
| 2011/0238223 A1 * | 9/2011 | Narayanamurthy | F24S 10/00 700/277 |
| 2011/0257795 A1 * | 10/2011 | Narayanamurthy | F24F 5/0046 700/277 |
| 2012/0024343 A1 * | 2/2012 | Narayanamurthy | F24F 5/0096 165/47 |
| 2012/0295534 A1 * | 11/2012 | Narayanamurthy | F24F 3/14 454/256 |
| 2017/0047887 A1 * | 2/2017 | Hilliard | F24S 23/75 |
| 2018/0195496 A1 * | 7/2018 | De Luca | F03D 9/37 |
| 2019/0288640 A1 * | 9/2019 | Hilliard | H02S 40/22 |

FOREIGN PATENT DOCUMENTS

| | | | | |
|---|---|---|---|---|
| EP | 3846337 A2 * | 7/2021 | | F03B 13/14 |
| KR | 20100004528 A | 1/2010 | | |

\* cited by examiner

ENERGY HARVESTING AND ELECTRICAL POWER GENERATION

CROSS-REFERENCE TO RELATED APPLICATIONS

This application claims priority to U.S. Provisional Patent Application No. 62/954,835, filed Dec. 30, 2019. The entire disclosure of the foregoing application is incorporated by reference in its entirety.

BACKGROUND

The present disclosure relates to the field of energy harvesting.

Renewable energy sources include converting solar, wind, or wave energy into electrical energy. Solar energy may be a sustainable energy source, and may be used both for residential and utility systems. For example, a photovoltaic panel may be angled vertically and horizontally towards an operational angle that allows converting solar energy to electrical energy from a fixed position. For example, a solar power plant produces 550 mega-watts of electrical power from photovoltaic panels covering 25 kilometers of land. Wind energy may be harvested using utility-scale generators. For example, a wind turbine may be 100 meters tall and produce 2 mega-watts of electrical power from the kinetic energy of the flow of air over the turbine blades. Wave energy converters may convert the flow of waves or water to electrical energy and this technology has much potential. For example, power plants may use this technology. For example, the power density of the photovoltaic panels may be 1 kilo-watt/meter^2 (kW/m2) at peak solar insolation, and the power density of the wind may be 1 kW/m2 at a wind speed of 12 meters per second, whereas the average annual power density of wave may be 25 kW/m2. Excess energy may be stored in electrical energy storage systems.

SUMMARY

The following is a short summary of some of the inventive concepts for illustrative purposes only and is not an extensive overview, and is not intended to identify key or critical elements or to limit or constrain the inventions and examples in the detailed description. One skilled in the art will recognize other novel combinations and features from the detailed description.

Energy harvesting is performed from multiple sources using a single device. For example, a solar panel may be combined with a fluid flow energy converter, such as a duct, generator, turbine, and or the like. For example, the fluid flow may be wind and a turbine may convert the wind entering on one side of the duct to energy. For example, a south facing solar panel may be combined with a north facing wind turbine duct. For example, the back side of the solar panel, two side shrouds, and a bottom shroud form a square frustum-shaped, partially-enclosed cavity with the base (large aperture) directed towards the wind direction, and a small aperture leading to a turbine for electrical power generation. One or more turbines may be located at the small aperture, along the lower edge of the panel, where the wind speed is increased from the frustum shape of the duct (from the large aperture to the small aperture).

The fluid flow for energy harvesting may be waves and a wave energy converter may be used to create electrical energy from the motion of the waves under the solar panel. For example, a buoyant duct apparatus may be shaped similar to an oblique square frustum, with the base of the frustum directed towards the wave source direction. The frustum may be anchored to a particular horizontal orientation, rotatable, with a turntable device, or have a directing vane to adjust the horizontal orientation of the fluid flow relative to a wave energy generator. The water from the waves through the duct may create electrical energy using the wave energy converter. Heat ducts may connect between the solar panel and the floating wave duct, and a thermoelectric generator may be positioned between the solar panel and the wave duct to use the temperature difference between the solar panel and sea temperature to generate electricity.

A solar panel for collecting solar energy may be combined with a thermoelectric energy harvesting device, such as a Peltier effect device. For example, a solar panel may be combined with a thermoelectric energy harvesting device and a wind turbine. For example, a solar panel may be combined with a thermoelectric energy harvesting device and a wave energy converter. For example, a solar panel may be combined with a thermoelectric energy harvesting device and a wave turbine. For example, a solar panel may be combined with a thermoelectric energy harvesting device, a wind turbine, and a wave turbine. Ducts may direct the fluid flow to a wave or wind turbine, and heat differences between the solar panel and the fluid flow may be drive thermal energy harvesting using as thermoelectric generator. Using the heat to generate electricity may assist in removing the heat from the solar panel, and making the solar panel more efficient. The fluid flow through the ducts may also assist in removing heat from the solar panel using heat pipes for conducting heat to a lower temperature flowing fluid.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

Figure 1A:
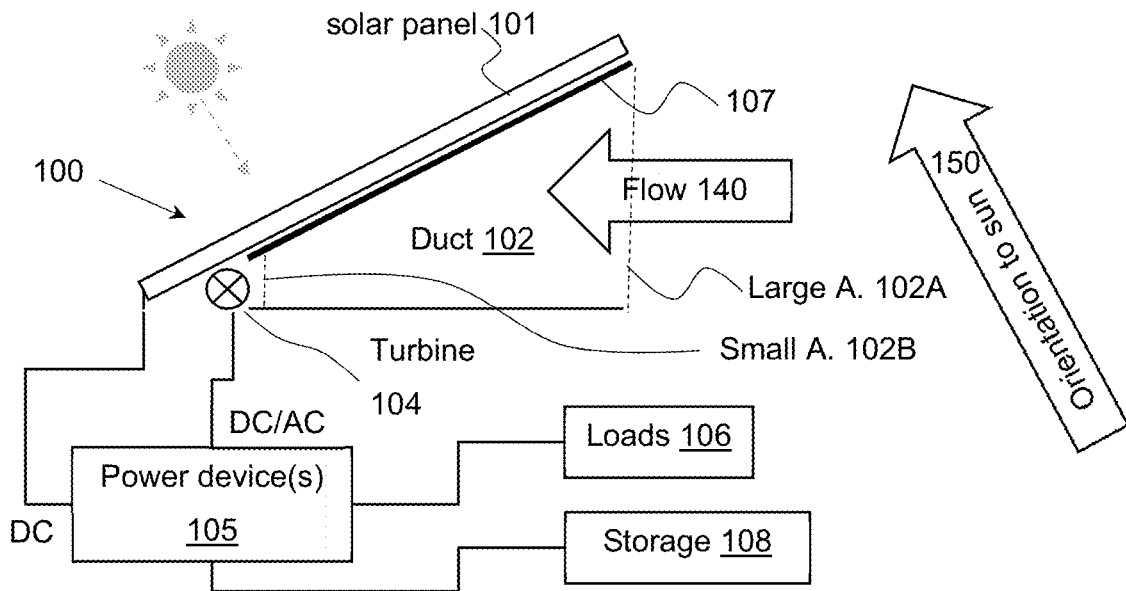
FIG. 1A shows, schematically, an example system for solar, heat, and flow energy conversion to electricity.

The accompanying drawings, which form a part hereof, show examples of the disclosure. It is to be understood that the examples shown in the drawings and/or discussed herein are non-exclusive and that there are other examples of how the disclosure may be practiced.

Disclosed herein are methods and devices for combining multiple source energy harvesting, such as solar, heat, fluid flow, etc. For example, a ducted turbine may collect energy from a flow of fluid (such as air/wind or waves) and be combined with solar panels for collected solar energy. A thermoelectric energy generator may be incorporated to collect energy from the temperature differences created between the solar panel and fluid flow. For example, a Peltier effect generator may be used to convert the heat flowing from the solar panel to the duct to create electrical power. A mechanical support for solar panels may incorporate one or more wind ducts, that increase wind speed prior to the wind operating a turbine, such as an impulse turbine. For example, a solar panel support comprises a bottom shroud and side shrouds which together with the bottom side of the solar panel (the non-operational surface) to direct wind energy towards an impulse turbine configured for collecting wind energy at wind speeds between 1 meter per second (m/s) and 30 m/s. For example, a solar panel on a floating support comprises a duct incorporated into the floating support to direct wave energy towards a reaction turbine or impulse turbine for converting the wave energy to electrical power.

Reference is now made to FIG. 1A, which shows, schematically, an example system 100 for solar, heat, and flow energy conversion to electricity. A solar panel 101 may have an operational surface oriented vertically 150 in the direction of a solar energy source. A duct 102 may support solar panel 101, and direct fluid flow 140 towards a turbine 104. A thermoelectric generator 107 may be located between solar panel 101 and duct 102. Duct 102 may be shaped as an oblique frustum, where the base is open, such as defining a large aperture 102A (e.g., divergent aperture), towards the fluid flow 140, and a small aperture 102B (e.g., convergent aperture, which is smaller compared to large aperture 102A) open on the other end to release the fluid flow from duct 102 cavity to turbine 104. The oblique frustum shape of the shrouds and solar panel form an oblique frustum-shaped cavity at least partially enclosed (such as enclosed except for the small and large aperture). In some examples, one side of the oblique frustum is parallel to the ground (or the water level) and another side of the oblique frustum is not parallel to the ground (or the water level). The large aperture 102A may be in a square shape, a rectangular shape, a round shape, or any other shape. The small aperture 102B may be in a square shape, a rectangular shape, a round shape, or any other shape. The large aperture 102A and the small aperture 102B may be in same or different shapes. The duct may comprise a bottom shroud and side shrouds to define the cavity. Small aperture 102B may be positioned at an end of the cavity and large aperture 102A may be positioned at an opposite end of the cavity. Electrical power (e.g., DC electrical power) generated by solar panel 102 and electrical power (e.g., DC or AC electrical power) generated by turbine 104 may be provided to one or more power devices 105, such as power converters, optimizers, junction boxes, inverters, micro-inverters, or the like. The power devices supply the electrical power to loads 106 and/or storage 108, such as household appliances, an electrical network, a grid, or a battery energy storage system.

Figure 1B:
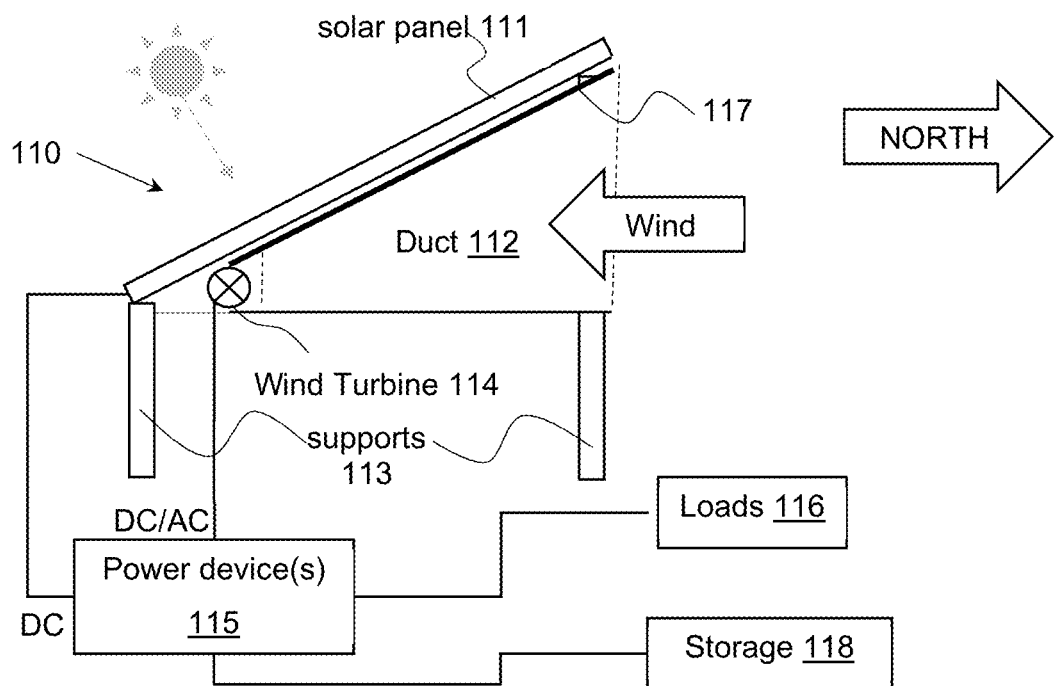
FIG. 1B shows, schematically, an example system for solar, heat and wind energy conversion to electricity.

Reference is now made to FIG. 1B, which shows, schematically, an example system 110 for solar, heat and wind energy conversion to electricity. A solar panel 111 may be oriented in the direction of a solar energy source, such as towards the south. A duct 112 may support solar panel 111, and may direct wind flow towards a turbine 114, such as wind flowing from the north. A thermoelectric generator 117 may be located between solar panel 111 and duct 112. Duct 112 may be shaped as an oblique frustum, where the base is open, such as defining a large aperture, such as towards wind from the north, and a small aperture open on the other end to release the fluid flow from duct 112 cavity to turbine 114. Duct 112 may be supported at a height above ground level using supports (or support legs) 113 that mechanically stabilize the solar panel 111 relative to the ground. When solar panel 111 is collecting solar energy, solar panel 111 temperature may increase, thereby reducing efficiency, and wind from through duct 112 may help reduce solar panel 111 temperature by convecting heat away from the non-operational surface (back surface) of the solar panel. Electrical power generated by solar panel 112 and turbine 114 may be provided to one or more power devices 115, such as power converters, optimizers, junction boxes, inverters, micro-inverters, or the like. The power devices may supply the electrical power to loads 116 and/or storage 118, such as household appliances, an electrical network, a grid, or a battery energy storage system.

A solar panel field may have multiple solar panels at an operational vertical angle oriented towards a solar power source, such as the sun. The operational vertical angle is configured to collect solar energy from the front side of the solar panel, directed towards the solar energy source. By adding ducts to the back side of the panel, the airflow below the panels may be regulated/controlled. The airflow may draw away heat from the panels. The airflow may be increased by a Venturi effect of the air flow in the supporting ducts below the panel. Thus, at the small aperture the wind speed may be increased and the collected energy may be increased. The Venturi effect may also assist in drawing air flow from the following solar panel in the wind direction (downwind from the first panel). Simulations have shown that the wind speed in the center of a solar field may be reduced by more than half of the wind speed at the leading edge of the field, but the remaining wind energy may be sufficient to collect a significant amount of wind energy relative the solar energy available at that time.

Figure 1C:
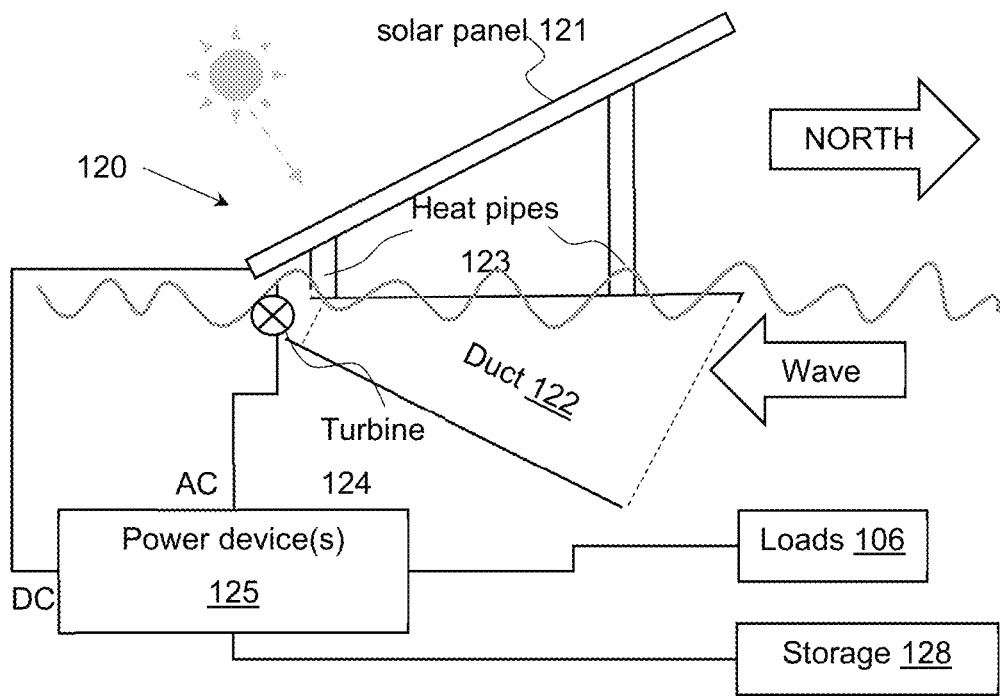
FIG. 1C shows, schematically, an example system for solar, heat and wave energy conversion to electricity.

Reference is now made to FIG. 1C, which shows, schematically, an example system 120 for solar, heat and wave energy conversion to electricity. A solar panel 121 may have an operational surface oriented in the vertical and horizontal direction of a solar energy source, such as the sun. For example, the solar panel 121 may be oriented at a vertical operational angle (e.g., an angle between the solar panel 121 and the horizontal plane) and at a horizontal operational angle (e.g., a polar angle on the horizontal plane). A duct 122 may act as a buoyancy device to support the weight of solar panel 121 and allow solar panel 121 to float on top of water, and duct 122 may direct the wave energy towards a turbine 124, such as a turbine of a wave energy generator. The duct 122 may support the solar panel 121 such that the front side of the solar panel 121 is oriented at an operational angle, e.g., a vertical operational angle and/or a horizontal operational angle, relative to a solar energy source, such as the sun. Heat pipes 123 incorporating a thermoelectric generator may support solar panel 121 above duct 122, and generate electrical power when there is a temperature difference between solar panel 121 and duct 122. Duct 122 may be shaped as an oblique frustum, where the base is open, such as defining a large aperture, towards the fluid flow, and a small aperture open on the other end to release the wave energy from duct 122 cavity to turbine 124. Electrical power generated by solar panel 122 and turbine 124 may be provided to one or more power devices 125, such as power converters, optimizers, junction boxes, inverters, micro-inverters, or the like. The power devices supply the electrical power to loads 126 and/or storage 128, such as household appliances, an electrical network, a grid, or a battery energy storage system.

Figure 1D:
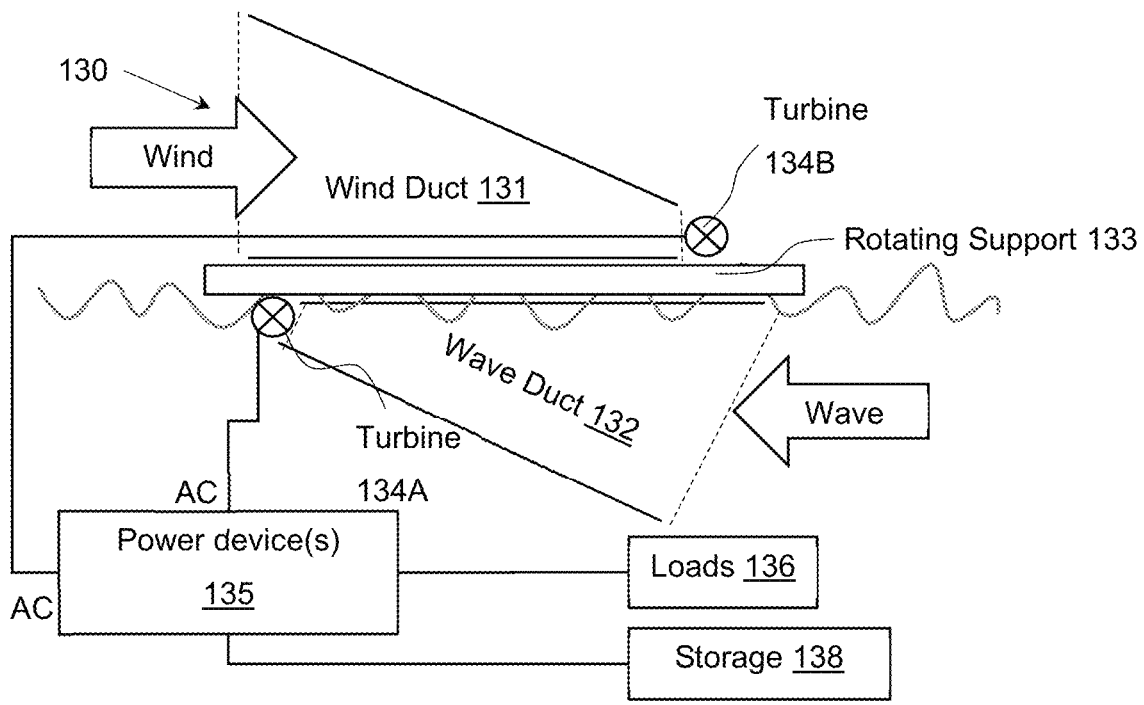
FIG. 1D shows, schematically, an example system for wind and wave energy conversion to electricity.

Reference is now made to FIG. 1D, which shows, schematically, an example system 130 for wind and wave energy conversion to electricity. A wind duct 131 may be positioned on a rotating support 133 above a wave duct 132. Rotating support 133 may incorporate a thermoelectric generator to convert a temperature difference between wind duct 131 and wave duct 132 to electrical energy. Rotating support 133 may orient each of wind duct 131 and wave duct 132 toward the wind or wave directions respectively. Wind duct 131 may direct the wave energy towards a turbine 134B. Wave duct 132 may direct the wave energy towards a turbine 134A, such as a turbine of a wave energy generator. Wind duct 131 and wave duct 132 may be shaped as oblique frustums, where the base is open, such as defining a large aperture, towards the fluid flow, and a small aperture open on the other end to release the wave energy to turbine 134A or 134B respectively. Electrical power generated by turbines 134A and 134B may be provided to one or more power devices 135, such as power converters, optimizers, junction boxes, inverters, micro-inverters, or the like. The power devices may supply the electrical power to loads 136 and/or storage 138, such as household appliances, an electrical network, a grid, or a battery energy storage system.

Figure 1E:
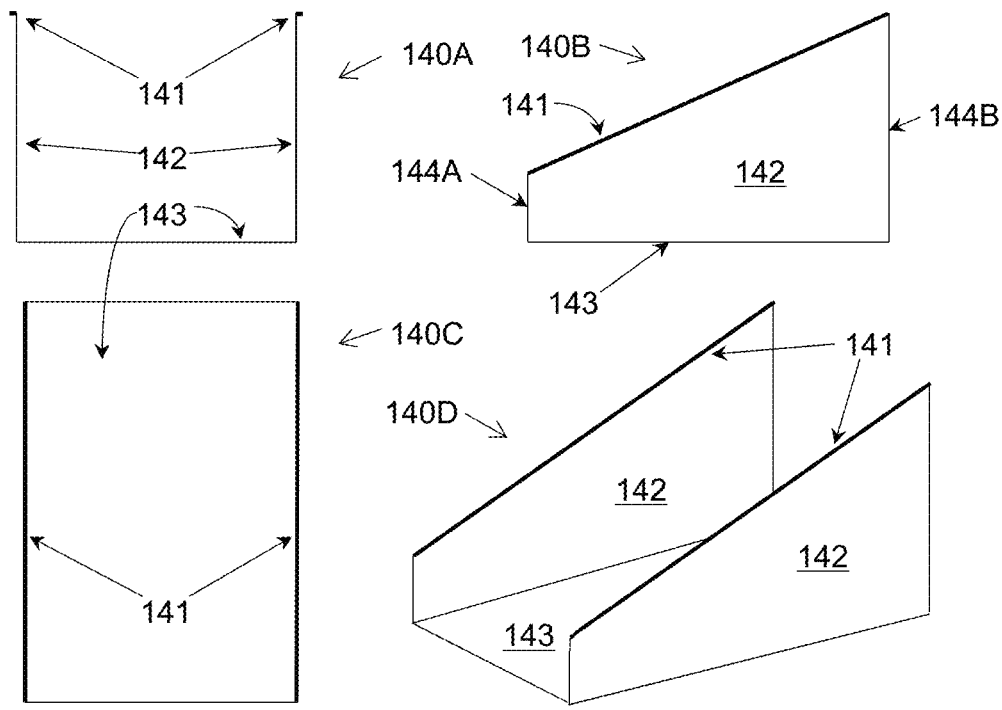
FIG. 1E shows, schematically, an example duct for a wind or a wave energy turbine.

Reference is now made to FIG. 1E, which shows a draft of an example duct for a wind or a wave energy turbine. Illustrated are an end view 140A, a side view 140B, a top view 140C, and a perspective view 140D. Top edges 141 may be used for attachment, such as to a solar panel or a rotating base. Side shrouds 142 and bottom shroud 143 limit fluid movement such that the fluid may flow from large aperture 144B to small aperture 144A. Side shrouds 142, bottom shroud 143, and solar panel/support base, define a partially-enclosed cavity shaped as an oblique frustum, where large aperture 144B is located at the base and small aperture 144A is located at the "apex".

In fields of aquatic solar panels, each solar panel may be supported by a floating device, and the floating device may incorporate a wave duct that collects wave energy and directs it towards a wave turbine. Each supporting device may also comprise a wind duct above the wave duct, that collects wind energy and directs it to a wind energy generator. For example, a field of connected solar panels on floating supports on water may collect solar, wind and wave energy concurrently. For example, the floating support comprises a rotating gantry to allow orienting the wave ducts in the wave direction, and the wind duct in the wind direction. For example, a controller may determine the wave speed, wind speed, and solar irradiance. Based on the energy levels available and collectable, the controller may determine the optimum selection of energy sources. For example, when the solar irradiance is 10% less than the combined wave and wind energy, preference may be given to collect wave and wind energy. For example, when there is cloud cover and the solar irradiance is less than 250 watts per meter square, a solar panel may produce 50 watts, and a wind turbine may produce 75 watts. A power device collecting energy from both the solar panel and the wind turbine may determine to orient the duct (and attached solar panel) towards the wind direction, such as by rotating a support of the duct under the solar panel.

Figure 2:
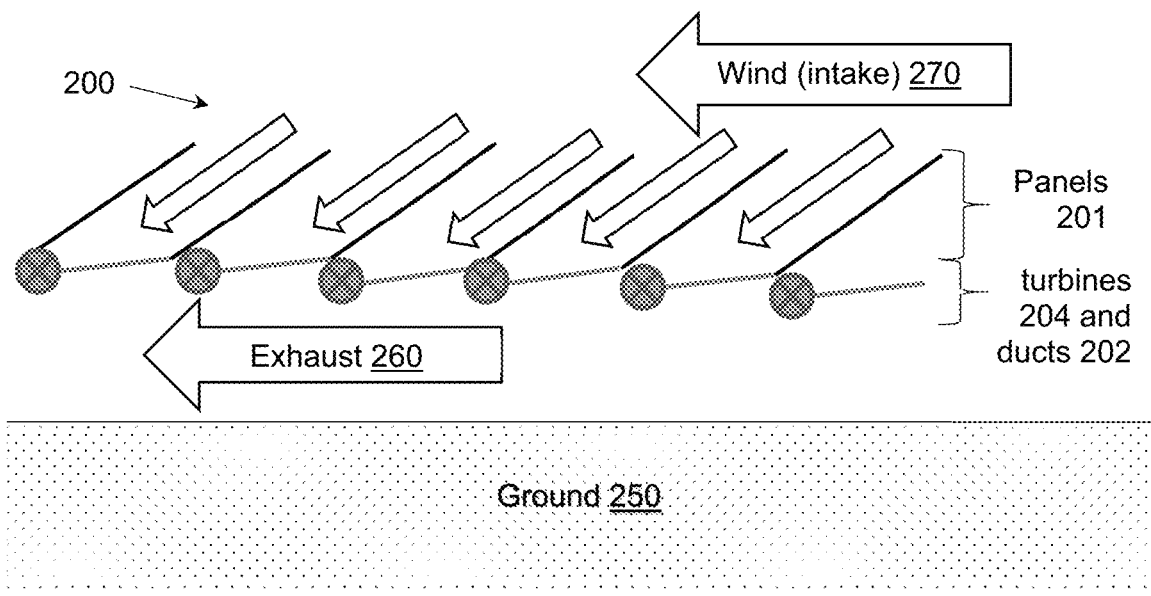
FIG. 2 shows, schematically, an example series of solar panels with incorporated wind turbines.

In land-based fields (e.g. arrays) of solar panels, each solar collector may be supported by a funnel-shaped duct, that directs wind energy towards a turbine. The supports may be further configured to allow an exhaust path for the wind energy to leave the turbine below or behind (e.g. downwind from) the solar panel supports. Reference is now made to FIG. 2, which shows, schematically, an example series 200 of solar panels with incorporated wind turbines. Wind intake 270 may be directed towards the rear faces of solar panels 201 in an array, where each solar panel has ducts 202 and turbines 204 for generating electrical energy. Solar panels 201 may be supported above ground 250, allowing a path for exhaust wind 260 to escape the turbines 204, thereby preventing the air speed between the solar panels 201 and ducts (prior to entering the turbines) from being decreasing resulting in a possible increase of power generation efficiency and capacity.

A turbine for a duct supporting a solar power panel may comprise a plurality of blades and generators. For example, more than one blade may be connected to a generator. For example more than one group of blades may be connected together with planetary gears to turn the shaft of one generator.

Figure 3:
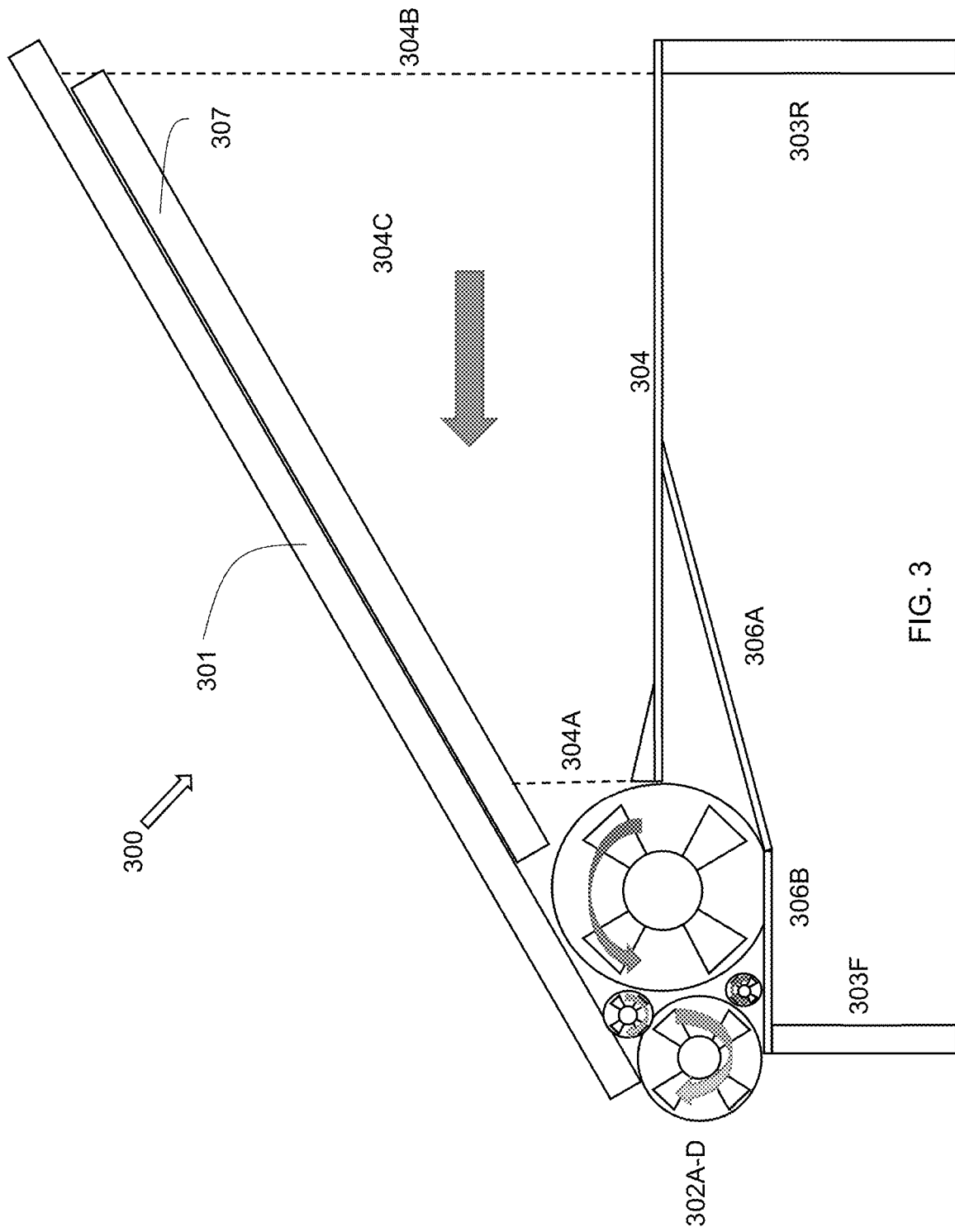
FIG. 3 shows, schematically, an example solar panel with attached ducts, thermoelectric generator, and wind turbines.

Reference is now made to FIG. 3, which shows, schematically, an example 300 solar panel with attached ducts, thermoelectric generator, and wind turbines, and example 300 solar panel with attached ducts, thermoelectric generator, and wind turbines may be implemented in any one of FIGS. 1A, 1B, and 2. Solar panel 301 may be attached to a thermoelectric generator 307, and attached to a duct 304. Duct 304 defines an oblique frustum shaped cavity 304C, with a large aperture 304B facing a wind direction, and a small aperture 304A directing wind flow towards one or more turbines 302A-302D. Windward motion of turbines 302A-302D may be protected from wind flow using shrouds 306A and 306B. Supports 303F and 303R may elevate solar panel 301 and duct 304 above ground level, enabling an exhaust path for wind from turbines 302A-302D, thereby facilitating the efficiency of energy conversion from wind to electric energy. Supports 303F and 303R may mechanically stabilize solar panel 301 relative to the ground.

Figure 4:
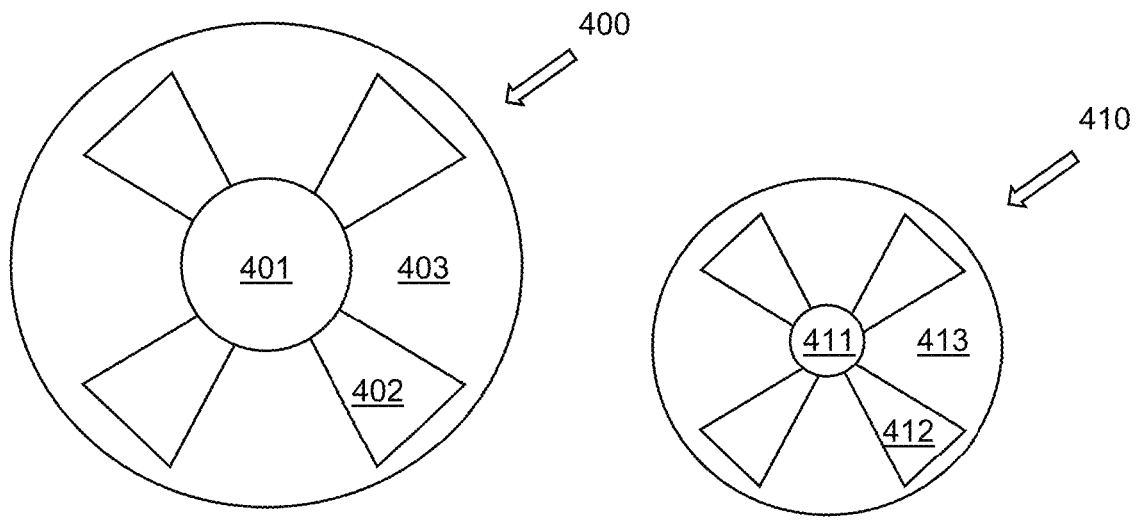
FIG. 4 shows, schematically, example wind turbine configurations for attaching to a solar panel.

Reference is now made to FIG. 4, which shows, schematically, example wind turbine configurations 400 and 410 for attaching to a solar panel. Turbine 400 may comprise a central hub generator 401, turbine blades 402, and end supports 403. Turbine 410 may comprise a hub or axle 411, turbine blades 412, and end supports 413 comprising a generator with optional planetary gear to allow adjusting the wind speed to the generator's optimal (or near optimal) rotation speed.

Surrounding the field perimeters, wind tunnel walls and/or a series of deflectors may divert a wind oriented from predominantly east-west horizontal direction to a north-south horizontal direction of the solar panels. For example, in a solar panel installation in the norther hemisphere, the solar panels may be oriented vertically southward at a 30 degree vertical angle, and the duct configured to collect wind energy from a north wind direction. When the wind is coming from a northeast direction, the deflectors may be oriented towards the north-east to deflect the wind to a north direction before entering the solar panel field. The term horizontal direction or orientation means the polar angle on a horizontal plane, such as the cardinal directions, and the term vertical direction or orientation means the angle between the solar panel and the horizontal plane.

Orientations of the deflectors may be stationary or adjustable. Wind vanes, walls, or deflectors, may be used to assist in horizontally orienting the wind direction, such as to create a wind tunnel effect. A sensor may determine wind speed and/or direction, and horizontally orient the deflectors so that a wind orientation is changed to match the orientation of the wind ducts. For example, a wind speed of 8 m/s from north-west is measured with an anemometer. A controller receives the anemometer measurements and determines that the wind can be deflected to the ducts (based on horizontally orientation limits) and is of sufficient wind speed to generate electrical power. The controller may send signals to each of an array of wind deflection panels, where the signal may direct the first row of panels to horizontally orient at a direction toward the north-west, such as at a 315 degree horizontal angle to north. The signal to the second row of panels may be slightly more towards the north, such as 5 degrees more north or 330 degrees. The signal to the third row of panels may direct the panels to a 345 degree relative to north. In this manner the wind deflectors may divert the wind direction from north-west to north, and directly into the large aperture of the ducts.

Figure 5:
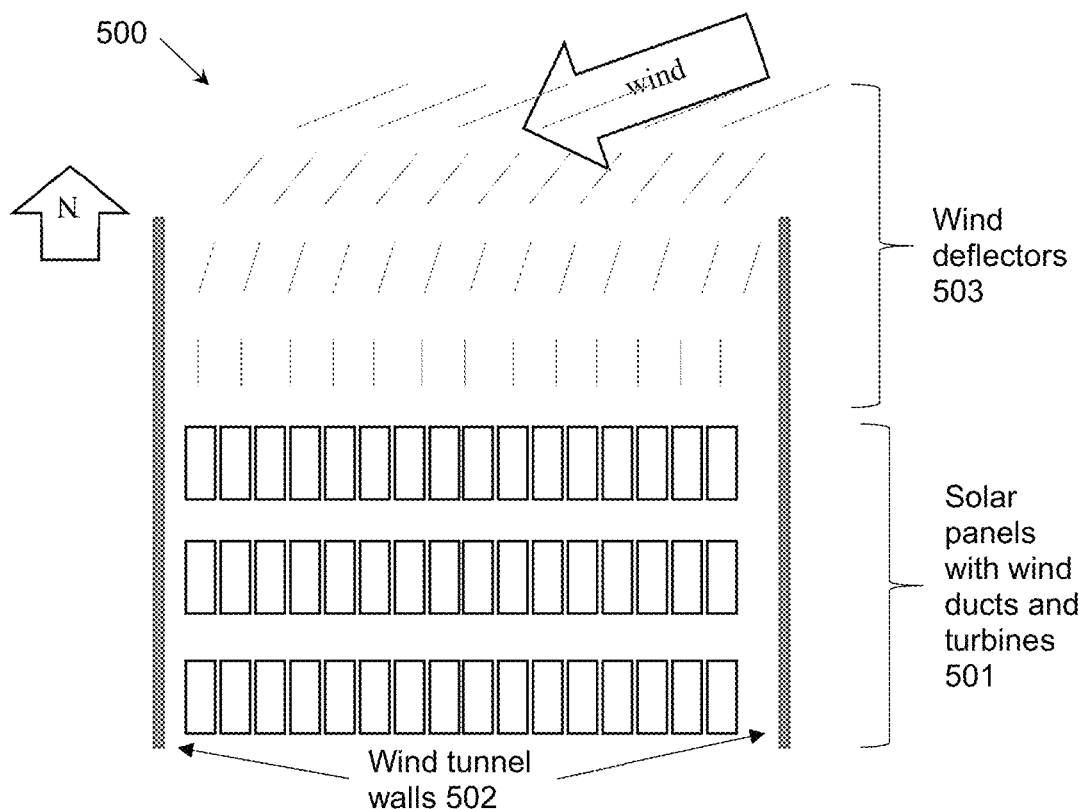
FIG. 5 shows, schematically, an example solar and wind farm, with wind tunnel walls and wind deflecting panels.

Reference is now made to FIG. 5, which shows, schematically, an example solar and wind farm 500, with wind tunnel walls 502 and wind deflecting panels 503. Wind may arrive at a horizontal angle relative to the horizontal orientation of the solar panel, and using wind deflecting panels 503 the horizontal direction of the wind may be changed to align with the large apertures of the ducts on under each solar panel 501. Wind tunnel walls 502 may provide a wind tunnel effect, to keep the wind direction aligned with solar panels with wind ducts and turbines 501.

Figure 6:
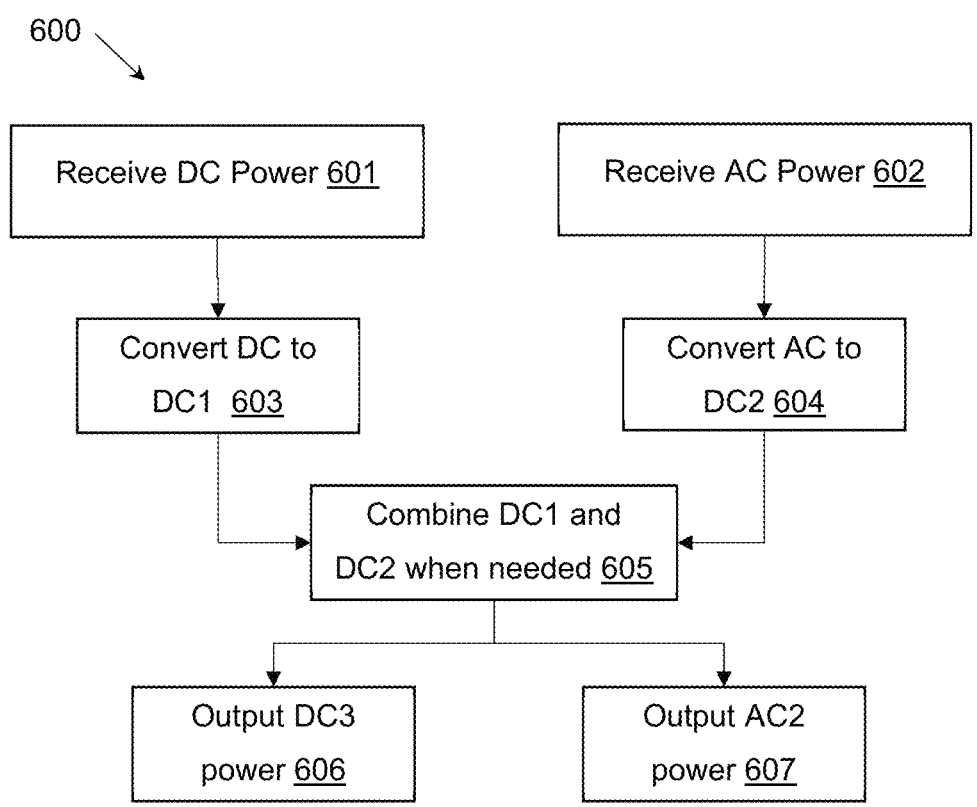
FIG. 6 shows a flowchart of an example method for combining power harvesting and producing an output power for loads and storage.

Reference is now made to FIG. 6, which shows a flowchart 600 of an example method for combining power harvesting and producing an output power for loads and storage. A power device may receive DC Power (e.g., DC electrical power from a solar panel) as at step 601, and the DC Power (at particular electrical parameters, such as voltage, current, etc.) may be converted to a DC1 Power as at step 603. A power device may receive AC Power (e.g., AC electrical power from a turbine) as at step 602, and the AC Power (at particular second electrical parameters, such as voltage, current, frequency, etc.) may be converted to a DC2 Power as at step 604, such as using a rectifying power converter. Powers DC1 and DC2 may be combined when needed as at step 605. The DC1, DC2, or combined power may be converted and outputted as DC3 Power as at step 606 and/or AC2 Power as at step 607.

Figure 7:
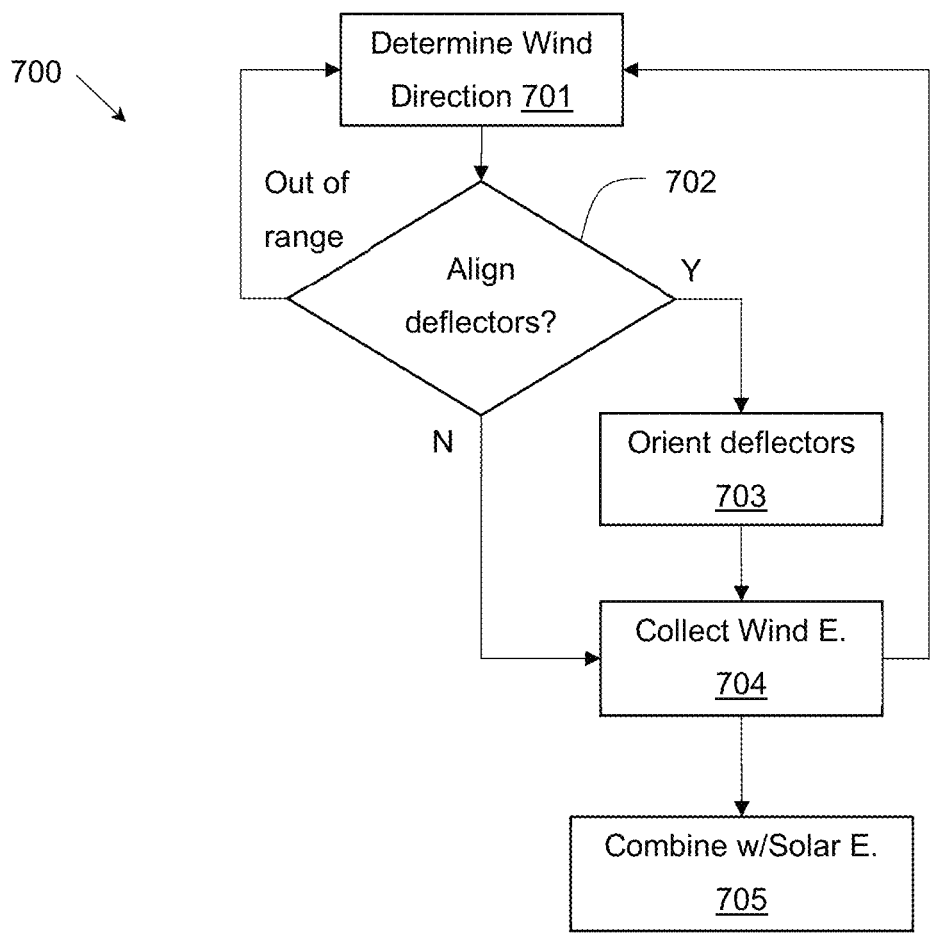
FIG. 7 shows a flowchart of an example method for aligning deflectors, collecting wind energy, and combining wind with solar power.

Reference is now made to FIG. 7, which shows a flowchart 700 of an example method for aligning deflectors, collecting wind energy, and combining wind with solar power. An anemometer may determine wind speed and direction as at step 701. When wind speed is above a threshold for energy harvesting, deflectors may be aligned as at step 702. When deflectors are already aligned with the wind direction, wind energy may be collected with a turbine as at step 704. When the deflectors are already not aligned with the wind direction, the deflectors may be oriented to the wind direction as at step 703, and wind energy may be collected with a turbine as at step 704. When the wind direction is out of range for the deflectors or ducts to collect wind energy, the process may return to monitoring the wind speed and direction as at step 701. Solar energy may be separately collected in parallel and combined with the wind energy as at step 705, such as using a power converter, power combiner, or the like.

Energy harvesting devices, such as generators, may be configured to operate in reverse, such that the input of electrical energy to the generator may cause the generator to produce the harvested energy as output. For example, a turbine may be operated in reverse to produce a blowing wind energy. For example, electrical energy may be supplied to a thermoelectric generator, such as comprising a Peltier effect generator, and the thermoelectric generator configured to output an uphill heat transfer (heat from low temperature side transferred to a high temperature side), such as comprising a refrigeration device. In this manner, heat may be removed from the solar panel to improve the photovoltaic (PV) efficiency.

Figure 8:
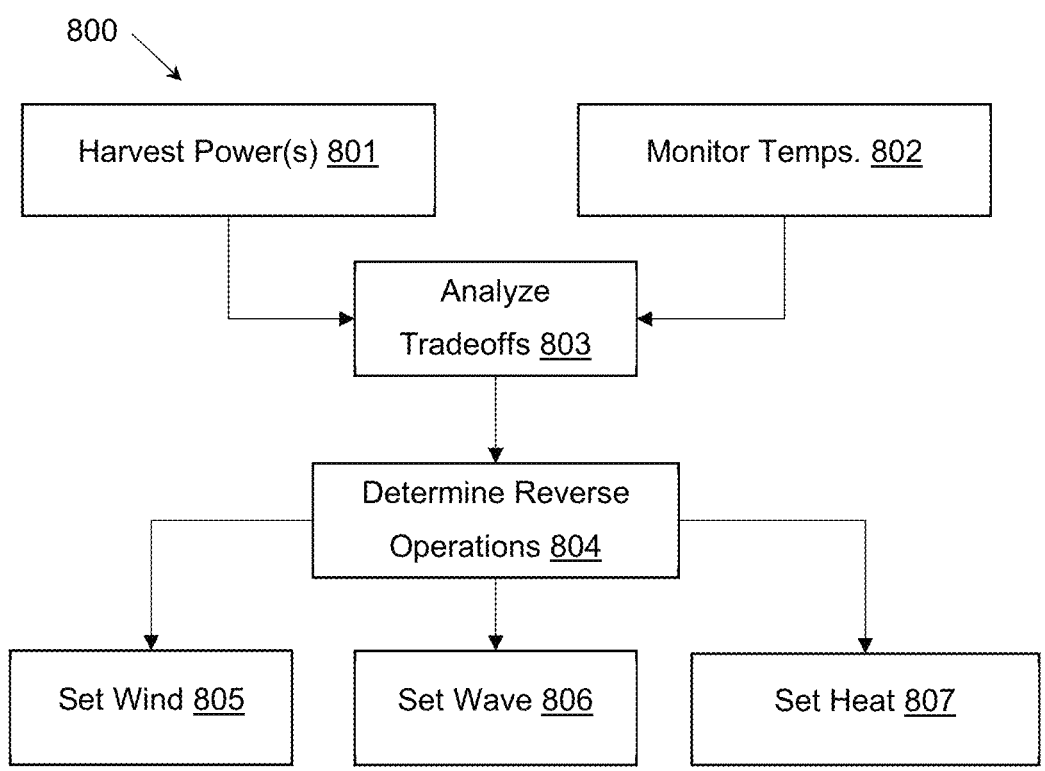
FIG. 8 shows a flowchart of an example method for reverse operation of a power harvesting device.

Reference is now made to FIG. 8, which shows a flowchart 800 of an example method for reverse operation of a power harvesting device. A power device (such as power devices 105, 115, 125, and/or 135) may harvest electrical power from solar, wind, wave, heat or other forms of energy from a power generating device, such as a solar panel (101, 111, 121, 131, etc.), a turbine, a thermoelectric generator, etc. The power device(s) may analyze the tradeoff as at step 803 between harvested power from each device, and the effects of reverse operation of one or more of the power generating devices. The reverse operations are determined from the analysis as at step 804, and the wind, wave, and heat generators may be set to the determined forward or reverse operations at steps 805, 806, and 807.

For example, if the solar panel is operating at 95 degrees Celsius (deg C.) collecting 200 W (W), and the wind turbine is generating 10 W of power, it may be preferable to operate the wind turbine in reverse. For example, operating the wind turbine in reverse, such as like a blower, at a power cost of 15 W, may reduce the solar panel temperature to 85 deg C. At 85 deg C. the solar panel may collect 250 W of power for a net power of 235 W while the forward operation only collects 210 W of power. So there will be a net benefit of 25 W (about 10% increase) in harvested power by operating the wind turbine in reverse.

For example, if the solar panel is operating at 98 deg C. collecting 180 W, and the thermoelectric generator is generating 5 W of power, it may be preferable to operate the thermoelectric generator in reverse. For example, operating the thermoelectric generator in reverse, such as like a cooling device, at a power cost of 25 W, may reduce the solar panel temperature to 90 deg C. At 90 deg C. the solar panel may collect 220 W of power for a net power of 195 W while the forward operation only collects 185 W of power. So there will be a net benefit of 10 W (about 5% increase) in harvested power by operating the thermoelectric generator in reverse.

For example, if the solar panel is operating at 90 deg C. collecting 220 W, and the wave turbine is generating 20 W of power, it may be preferable to operate the wave turbine in reverse. For example, operating the wave turbine in reverse, such as like a water pump, at a power cost of 25 W, may reduce the solar panel temperature to 80 deg C. At 80 deg C. the solar panel may collect 275 W of power for a net power of 250 W while the forward operation only collects 240 W of power. So there will be a net benefit of 10 W (about 5% increase) in harvested power by operating the wind turbine in reverse.

Similar analysis may determine that the reverse operation of any of the wind, wave, and/or heat generators may produce a net benefit in power harvesting. For example, it may be determined based on the analysis that the wind and wave generators be operated in reverse and thermoelectric generator operated in the forward direction produces the highest net power from the system. For example, it may be determined based on the analysis that the wind and thermoelectric generators be operated in reverse and wave generator operated in the forward direction produces the highest net power from the system. For example, it may be determined based on the analysis that the wave and thermoelectric generators be operated in reverse and wind generator operated in the forward direction produces the highest net power from the system. For example, it may be determined based on the analysis that the wind, wave, and thermoelectric generators all be operated in reverse to produce the highest net power from the system. Further, it may be determined how much power to supply during reverse operation to achieve the highest power from the system. For example, it may be determined in a particular set of circumstances that the wind generator operate in reverse at half power, the wave generator operate in reverse at 75% power, and the thermoelectric generator operate in reverse at 25% power.

Turbines used for wind or wave power harvesting may be a reaction type turbine, an impulse type turbine, or a combination of reaction type and impulse types. Ying et al in "An aerodynamic analysis of a novel small wind turbine based on impulse turbine principles" (published in Renewable Energy Volume 75, March 2015, Pages 37-43) describes an example of a small impulse turbine. The peak efficiency range for a turbine may be configured to be efficient at a predetermined range of wind speeds. For example, an electrical generator of a turbine may be configured to operate at 90% efficiency or above from wind or wave speeds of 2 m/s to 12 m/s, thereby covering 95% of the harvestable annual energy range. A turbine comprises a plurality of rotor blades coupled to an electric generator. A planetary gear may be used to adjust the rotor blade speed to the efficiency range of the generator. Turbine blade rotors may be configured for horizontal axis operation, such as a horizontal axis helix turbine. The turbine may be a vertical axis turbine, or a row of vertical axis turbines to cover the small aperture opening of the duct. For example, a reaction turbine comprises a 3-Blade Savonious rotor for harvesting wind and wave energy and is configured with the parameters of table 1.

TABLE 1

Configuration of a reaction turbine with a 3-Blade Savonious rotor.

| Configured parameter | Value | Notes |
|---|---|---|
| Rated output: | 24 W | at 8 m/s |
| Peak output: | 200 W | |
| Cut-in speed: | 5 m/s | |
| Weight: | 13 Kg | |
| Generator type: | 3-Phase Brushless NIB rotor PMA | |
| Output voltage: | 48 VDC | |
| Annual energy | 210 KWh | at rated 24 W |

Simulation data has shown that the speed of wind at the bottom of a panel of an array of solar panels (at least three rows from the end), may be less than half of the speed at the leading edge of the array. When an average wind speed at the leading edge of the array is 8 meters per second (m/s), the speed throughout most of the array may be up to 4 m/s. When ducts below the solar panels, the wind speed may increase to 6 or 7 m/s thought the array. Thus the wind damping effect from the upwind rows of the array may be balanced by the use of ducts to improve the wind speed and power generation.

Power production from a wind turbine at the small aperture of the duct may be calculated from other turbine data. For example, a 2 megawatt wind turbine (e.g. with 90 meter blades) may sweep a 6200 square meter (m^2) area, thus producing an average of 0.3 KW/m^2. A solar panel of approximately 1 meter (m) by 2 m, raised at a vertical angle of 30 degrees in a south direction has a large aperture of about 1 m^2 vertical area facing north to use as the duct input, thereby producing about 300 W of power at an airspeed of 30 km/h. The addition of the wind harvesting may double the energy power output relative to solar power alone. Power production from a ducted wind turbine of 8.5 m^2 may produce 3 kW of power on average, making the power density=370 W/m^2. A ducted turbine may produce more power for a given area due to the Venturi effect and the cubed relationship of wind speed to power. Thus a ducted turbine under a solar panel may produce an average 370 W of power from wind energy. Other simulations based on ducted turbines show at least 60 W/m^2 at 4 m/s wind speed.

Specific dimensions, specific materials, specific ranges, specific resistivities, specific voltages, specific shapes, and/or other specific properties and values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. For example, the disclosure of a first value and a second value for a given parameter can be interpreted as disclosing that any value between the first and second values could also be employed for the given parameter. For example, if parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having or involving several parts, elements, or members.

It may be noted that various connections are set forth between elements herein. These connections are described in general and, unless specified otherwise, may be direct or indirect; this specification is not intended to be limiting in this respect, and both direct and indirect connections are envisioned. Further, elements of one feature in any of the embodiments may be combined with elements from other features in any of the embodiments, in any combinations or sub-combinations.

All described features, and modifications of the described features, are usable in all aspects of the inventions taught herein. Furthermore, all of the features, and all of the modifications of the features, of all of the embodiments described herein, are combinable and interchangeable with one another.

The skilled person will appreciate that inventive aspects disclosed herein may include an apparatus or a system or a method as in any of the following clauses:

CLAUSES

Clause 1. An apparatus, comprising:
 a duct configured to:
  attach to a non-operational surf ace of a solar panel,
  mechanically support the solar panel, and
  form a partially-enclosed cavity with the solar panel, wherein the partially-enclosed cavity comprises a first aperture and a second aperture, wherein the duct and solar panel are configured to direct a flow of fluid from the first aperture to the second aperture; and
 a flow energy generator, located at the second aperture, configured to collect flow energy.

Clause 2. The apparatus of Clause 1, wherein the first aperture is bigger than the second aperture.

Clause 3. The apparatus of any one of Clauses 1-2, wherein the solar panel is positioned at an operational vertical angle and operational horizontal angle.

Clause 4. The apparatus of any one of Clauses 1-3, wherein the duct supports the solar panel at an operational angle.

Clause 5. The apparatus of any one of Clauses 1-4, wherein the duct comprises an oblique frustum-shaped cavity, and the first aperture and the second aperture are disposed at opposite ends of the cavity, respectively.

Clause 6. The apparatus of any one of Clauses 1-5, wherein the fluid is air, and flow energy is wind energy.

Clause 7. The apparatus of any one of Clauses 1-6, wherein the fluid is water, and the flow energy is wave energy.

Clause 8. The apparatus of any one of Clauses 1-7, wherein the flow energy generator comprises an electrical energy generator mechanically connected to at least one blade of a wind turbine or a wave turbine.

Clause 9. The apparatus of any one of Clauses 1-8, wherein the flow energy generator comprises an electrical energy generator mechanically connected to at least one blade of an impulse turbine.

Clause 10. The apparatus of any one of Clauses 1-9, wherein the flow energy generator comprises a plurality of electrical energy generators mechanically connected to a plurality of blades of a plurality of impulse turbines.

Clause 11. The apparatus of any one of Clauses 1-10, wherein the flow energy generator comprises support shrouds in line with side shrouds of the duct, and wherein the support shrouds mechanically support the flow energy generator.

Clause 12. The apparatus of any one of Clauses 1-11, wherein the duct further comprises support legs configured to mechanically stabilize the solar panel relative to the ground.

Clause 13. The apparatus of any one of Clauses 1-12, wherein the solar panel further comprises support legs configured to mechanically stabilize the solar panel relative to the ground, and the support legs further mechanically support the duct.

Clause 14. A system comprising:
 a solar panel configured to collect solar energy and convert the solar energy to solar electrical energy;
 a duct configured to:
  attach to a non-operational surface of a solar panel,
  mechanically support the solar panel, and
  form a partially-enclosed cavity with the solar panel, wherein the partially-enclosed cavity comprises a first aperture and a second aperture, wherein the duct and solar panel are configured to direct a flow of fluid from the first aperture to the second aperture;
 a flow energy generator, located at the second aperture, is configured to collect flow energy and convert the flow energy to flow electrical energy; and
 an inverter configured to:
  convert the solar electrical energy and flow electrical energy from a first voltage and first current to a second voltage and second current.

Clause 15. The system of Clause 14, further comprising deflection devices configured to direct the wind or wave flow direction towards the first aperture.

Clause 16. The system of any one of Clauses 14-15, wherein the deflection devices are stationary.

Clause 17. The system of any one of Clauses 14-16, wherein the deflection devices comprise a mechanical horizontal orientation adjustment.

Clause 18. The system of any one of Clauses 14-17, wherein the deflection devices comprise an electro-mechanical horizontal orientation adjustment.

Clause 19. The system of any one of Clauses 14-18, wherein the deflection devices comprise at least one of wind tunnel walls and rotatable wind deflectors.

Clause 20. The system of any one of Clauses 14-19, wherein the horizontal and vertical operational angles comprise an orientation towards a solar power source.

Clause 21. A method for harvesting solar and flow energies, comprising:
 supporting a solar panel, comprising a front side and a back side, wherein the front side is oriented at an operational angle relative to a solar energy source;
 harvesting solar energy from the solar panel when solar irradiance is present;
 measuring a horizontal orientation of a flow energy;
 adjusting at least one flow deflector to horizontal direct the flow energy towards the back side of the solar panel;
 directing, horizontally, the flow energy along the back side towards a flow energy generator;
 harvesting flow energy from the flow energy generator when the flow is flowing; and
 combining the solar energy and the flow energy using a power converter.

Clause 22. A method for harvesting solar and wind energies, comprising:
 supporting a solar panel, comprising a front side and a back side, wherein the front side is oriented at an operational angle relative to a solar energy source;
 harvesting solar energy from the solar panel when solar irradiance is present;
 directing wind along a back side of the solar panel towards a wind energy generator;
 harvesting wind energy from the wind energy generator when the wind is blowing; and
 combining the solar energy and the wind energy using a power converter.

Clause 23. A method for harvesting solar and wave energies, comprising:

supporting a solar panel, comprising a front side and a back side, wherein the front side is oriented at an operational angle relative to a solar energy source;

harvesting solar energy from the solar panel when solar irradiance is present;

directing waves, using a duct supporting the solar panel, towards a wave energy generator;

harvesting wave energy from the wave energy generator when the waves are flowing; and combining the solar energy and the wave energy using a power converter.

Clause 24. A method for harvesting solar, wind, and wave energies, comprising:

supporting a solar panel, comprising a front side and a back side, wherein the front side is oriented at an operational angle relative to a solar energy source;

harvesting solar energy from the solar panel when solar irradiance is present;

directing wind along a back side of the solar panel towards a wind energy generator;

harvesting wind energy, using a wind duct, from the wind energy generator when the wind is blowing;

determining a flow direction of a wave energy;

orienting, horizontally, a wave duct, using a rotating support, towards a source of the wave energy;

directing waves, using the wave duct supporting the solar panel and supporting the wind ducts, towards a wave energy generator;

harvesting wave energy from the wave energy generator when the waves are flowing; and combining the solar energy, the wind energy, and the wave energy using a power converter.

What is claimed is:

1. An apparatus, comprising:
a plurality of shrouds configured to:
attach to a non-operational surface of a solar panel, mechanically support the solar panel, and
form, with the solar panel, a cavity with a divergent aperture and a convergent aperture respectively disposed at opposite ends of the cavity, wherein the cavity is configured to direct a flow of fluid from the divergent aperture to the convergent aperture; and
a flow energy generator, located at the convergent aperture and configured to collect flow energy.

2. The apparatus of claim 1, wherein the divergent aperture is bigger than the convergent aperture.

3. The apparatus of claim 1, wherein the solar panel is positioned at an operational vertical angle and an operational horizontal angle.

4. The apparatus of claim 1, wherein the plurality of shrouds support the solar panel at an operational vertical angle or an operational horizontal angle.

5. The apparatus of claim 1, wherein the fluid is air, and the flow energy is wind energy.

6. The apparatus of claim 1, wherein the fluid is water, and the flow energy is wave energy.

7. The apparatus of claim 1, wherein the flow energy generator comprises an electrical energy generator mechanically connected to at least one blade of a wind turbine or a wave turbine.

8. The apparatus of claim 1, wherein the flow energy generator comprises an electrical energy generator mechanically connected to at least one blade of an impulse turbine.

9. The apparatus of claim 1, wherein the flow energy generator comprises a plurality of electrical energy generators mechanically connected to a plurality of blades of a plurality of impulse turbines.

10. The apparatus of claim 1, wherein the plurality of shrouds comprise support shrouds and side shrouds, and wherein the support shrouds are in line with the side shrouds and mechanically support the flow energy generator.

11. The apparatus of claim 1, further comprising support legs configured to mechanically stabilize the solar panel relative to the ground.

12. The apparatus of claim 1, further comprising support legs configured to mechanically stabilize the solar panel relative to the ground, and the support legs further mechanically support the plurality of shrouds.

13. The apparatus of claim 1, wherein the plurality of shrouds comprise a first side shroud, a second side shroud, and a bottom shroud, and wherein the first side shroud, the second side shroud, and the bottom shroud, and the solar panel together form the cavity.

14. The apparatus of claim 1, wherein the cavity is an oblique frustum-shaped cavity comprising a pair of trapezoidal side walls.

15. A system comprising:
a solar panel configured to collect solar energy and convert the solar energy to solar electrical energy;
a plurality of shrouds configured to:
attach to a non-operational surface of the solar panel, mechanically support the solar panel, and
form, with the solar panel, a cavity with a divergent aperture and a convergent aperture respectively disposed at opposite ends of the cavity, wherein the cavity is configured to direct a flow of fluid from the divergent aperture to the convergent aperture;
a flow energy generator, located at the convergent aperture and configured to collect flow energy and convert the flow energy to flow electrical energy; and
an inverter configured to:
convert the solar electrical energy and the flow electrical energy from a first voltage and a first current to a second voltage and a second current.

16. The system of claim 15, further comprising a deflection device configured to direct wind or wave flow towards the divergent aperture.

17. The system of claim 16, wherein the deflection device is stationary.

18. The system of claim 16, wherein an orientation of the direction is configured to be mechanically adjusted.

19. The system of claim 16, wherein an orientation of the direction is configured to be electro-mechanically adjusted.

20. The system of claim 16, wherein the deflection device comprises at least one of wind tunnel walls or rotatable wind deflectors.

21. A method comprising:
supporting a solar panel with a front side oriented at an operational vertical angle or an operational horizontal angle relative to a solar energy source;
harvesting solar energy from the solar panel when solar irradiance is present;
measuring a horizontal orientation of a flow of fluid;
adjusting an orientation of at least one flow deflector to horizontally direct the flow of fluid towards a back side of the solar panel;
directing, from a divergent aperture of a cavity to a convergent aperture of the cavity formed by the solar panel, the flow of fluid along the back side towards a flow energy generator, wherein the divergent aperture and the convergent aperture are respectively disposed at opposite ends of the cavity;
harvesting electrical energy from the flow energy generator when the flow of fluid is flowing; and combining the solar energy source and the flow energy using a power converter.

* * * * *